Figure 5:
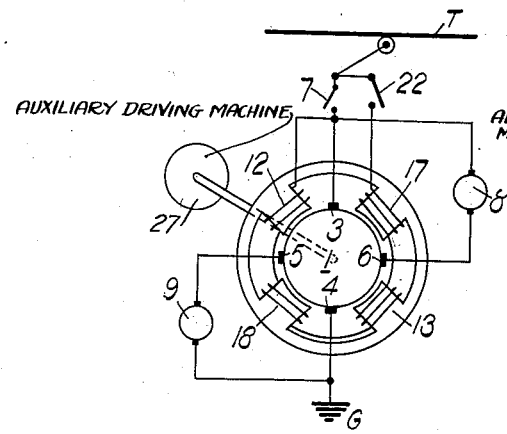

Sept. 22, 1936.   G. M. PESTARINI   2,055,304
CONTROL OF DIRECT CURRENT ELECTRIC MOTORS
Filed June 24, 1933   2 Sheets-Sheet 1
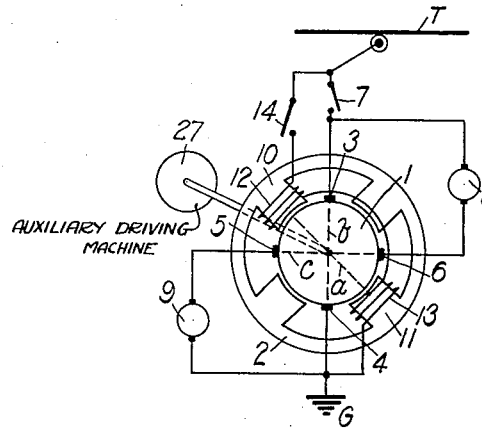
Fig.1.
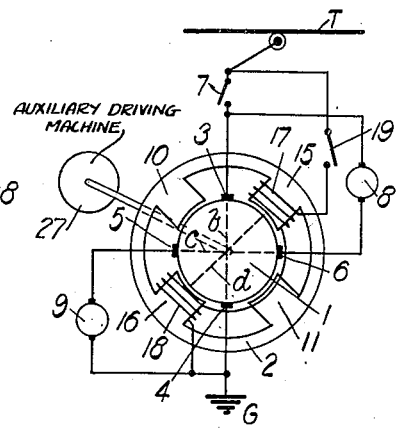
Fig.2.
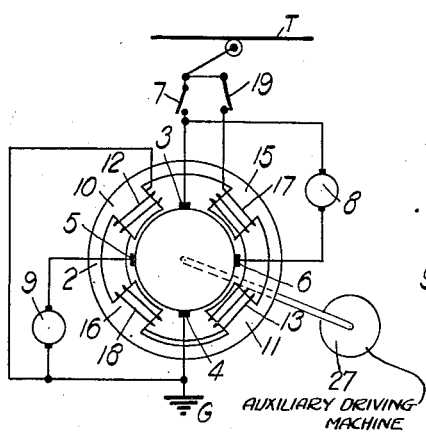
Fig.3.
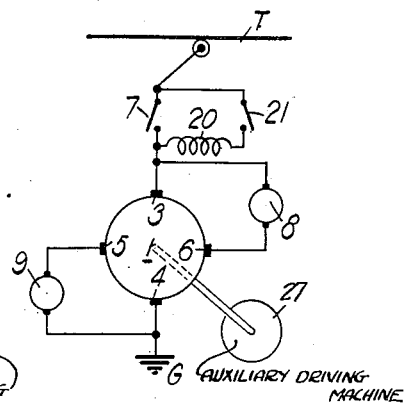
Fig.4.
INVENTOR
Giuseppe M. Pestarini
By 
ATTORNEY Sept. 22, 1936.  G. M. PESTARINI  2,055,304
CONTROL OF DIRECT CURRENT ELECTRIC MOTORS
Filed June 24, 1933   2 Sheets-Sheet 2

INVENTOR
Giuseppe M. Pestarini
By
ATTORNEY

Patented Sept. 22, 1936

2,055,304

UNITED STATES PATENT OFFICE 2,055,304

CONTROL OF DIRECT CURRENT ELECTRIC MOTORS

Giuseppe Massimo Pestarini, Sheffield, England

Application June 24, 1933, Serial No. 677,522
In Great Britain July 27, 1932

12 Claims. (Cl. 171—123)

This invention relates to the control of direct current electric motors and has for its object to provide improved arrangements for connecting to the supply line direct current motor equipments which are operated in connection with a rotary direct current transformer hereinafter referred to as a metadyne transformer.

A metadyne transformer is a rotary machine somewhat similar in construction to a direct current dynamo electric machine in that it has an armature with windings and a commutator (sometimes more than one commutator) and a stator, generally with salient poles, within which the armature rotates. In the simplest form two pairs of brushes are arranged to make contact with the commutator, one pair of which form the primary brushes by which current is led into and out of the armature from a source of direct current supply, the other pair forming the secondary brushes by which the current generated in the armature is led to one or more consumption or load circuits. In some cases more than two pairs of brushes are provided. The rotor is rotated in the magnetic field due to the currents circulating in the rotor windings, and the action of the machine is such that the current flowing in the consumption or load circuit or circuits is maintained at a substantially constant value irrespective of the resistance within limits of said consumption or load circuit. The stator affords a return path of low magnetic reluctance for the flux which is set up by the rotor currents. The stator is usually provided with various windings by which magnetic fluxes are set up which regulate the electrical and mechanical performance of the machines.

For a fuller description of metadyne transformers reference is directed to the specifications of French Patents No. 547,855, dated 25th February 1922, No. 623,438, dated 27th January 1926, and No. 637,946, dated 25th November 1926. A description of the general construction and operation of metadyne transformers, generators and motors treated mathematically in considerable detail will also be found in a paper entitled "Esquisse sur la Metadyne" by G. M. Pestarini in the Bulletin Scientifique A. I. M. No. 4 April 1931 of l'Association des Ingénieurs Electriciens, published by the Institut Electrotechnique Montefiore, Liège.

With a motor and metadyne transformer equipment such as above indicated the metadyne transformer must be started into rotation and brought up to its normal speed by some means, for example by a motor connected across the supply mains or other auxiliary driving machine, and its primary circuit must be connected to the supply line. This may be done through a switch or circuit interrupter which must be closed whatever may be the actual connections of the metadyne with the controlled motors and the actual electromotive force developed by them. If, however, the opening and closing of the switch has to occur very frequently the current and mechanical shocks resulting from the sudden closure of a switch connecting the machines to a circuit of comparatively high voltage, such, for example, as 3000 volts, will result in damage to the machines. It is, therefore, desirable to provide means whereby the voltage on either side of the switch may be brought to the same value before closure of the switch takes place so as to prevent sudden variation in the current occurring at the time of closure.

With this object in view according to the present invention means are provided for developing a counter electromotive force in the metadyne which shall be substantially equal to the voltage of the supply line. This may be done in several ways.

In one method according to the invention the stator of the metadyne transformer may be furnished with windings to which a current is supplied before the main circuit is closed and the current in which induces a magnetic flux in the rotor core in such a direction that, due to the rotation of the rotor, an electromotive force in a sense opposing that of the main supply is developed at the primary brushes of the machine without any circulation of current taking place in the secondary circuit.

In a second method the windings on the stator are such as will induce a flux in the rotor core in a direction whereby when the rotor is rotating an electromotive force is developed at the secondary brushes. If the circuit between the secondary brushes is closed a current will circulate through the rotor windings by which a magnetic flux will be induced in the core such that the rotation of the rotor will develop an electromotive force between the primary brushes as in the first arrangement, but independent of the connection of the primary brush set to an external source of electrical power supply. However the second method is usually preferred as fewer ampere turns are required on the stator to produce the necessary electromotive force between the primary brushes.

The two methods just described may in some cases be combined, in which case the stator winding must be arranged both to induce immediately a counter electromotive force direct between the primary brushes and also to cause a current to circulate in. the secondary circuit through the rotor windings the magnetic flux due to which current develops an electromotive force between the primary brushes. The sum of these two electromotive forces are together arranged to be substantially equal to the line voltage.

It is a common plan in connection with switches or circuit interrupters employed with high voltages to provide an impedance shunting the switch contacts so that the apparatus to be connected to a high voltage line is first connected through the impedance so that the current will gradually increase without surges or peaks from zero to that normally transmitted through the switch, after which the switch may be closed.

An advantageous arrangement according to the present invention consists in combining one or other of the methods above described with this last mentioned arrangement of a reactance for which purpose the reactance may be constituted by an external choke coil or an additional winding on the stator of the metadyne.

After the counter electromotive force has been made equal to the line voltage by one of the methods above indicated a balancing relay which is operated by a difference in voltage at the two contacts of the switch or circuit breaker may be employed for closing or permitting the closure of the switch, or such a relay may be employed to give an indication that the voltages on the two sides of the switch are the same, whereupon the switch may be closed by hand or otherwise, or the counter electromotive force may be measured by an instrument connected between the ground and the primary brush which is joined to the switch and when this is substantially equal to the line voltage the switch may be closed, either by the instrument or a relay, or manually or otherwise.

In another arrangement the switch is closed a predetermined time after the stator windings have been energized, the time being so chosen as to enable the counter electromotive force to rise to the requisite value.

In the arrangements above described it is assumed that the armature is revolving, otherwise there will be no cutting of flux by rotor conductors. Where, however, the starting reactance is constituted wholly or partly by winding on the metadyne stator the metadyne may be connected to the line when at rest if said stator winding is arranged so that when a current circulates in said winding a torque is exerted on the metadyne rotor. It will be easily seen that as soon as the rotor begins to revolve a counter electromotive force at the primary brushes will be developed which will gradually increase as the speed of the rotor increases until when the latter has reached the desired normal speed, the counter electromotive force is substantially equal to the line voltages and independent of the connection of the primary brush set to an external source of electrical power supply, whereupon the metadyne transformer may be connected direct to the circuit and the stator winding (with the starting resistance if present) cut out.

The reactance or resistance may be gradually reduced in value by any suitable means, for example by electromagnetic switches in a similar manner to that commonly employed for reducing the accelerating resistance in the armature circuit when starting a direct current electric motor or by means of a rotary switch similar to a direct current motor starter.

The invention will now be further described with reference to the accompanying drawings which are electrical diagrams illustrating by way of example methods of carrying out the same in practice.

In all the figures a one-cycle machine is shown. The rotor of the transformer is indicated at 1 and the stator at 2. The primary brushes are shown at 3 and 4, and the secondary brushes at 5 and 6. The primary brush 3 is arranged to be connected through a main switch indicated by two lines in the conventional manner at 7 to a trolley line T, and the primary brush 4 is arranged to be connected to ground G. In the majority of the figures the load in the secondary circuit is indicated as comprising two motors 8 and 9 connected between the brushes 3 and 6 and 4 and 5 respectively in the well known figure-8 connection, but in Figs. 6 and 8 the load, also indicated as being two motors 8 and 9, is shown as being connected to the secondary brushes 5 and 6 in the well known cross-connection. An auxiliary driving means for starting up the rotor is shown at 27 in Figs. 1, 2, 3, 4, 5 and 6.

Referring now to Fig. 1 the polar projections 10, 11 of the stator are provided with windings 12, 13 adapted to be connected through a switch 14 to the source of supply T and ground G. Assuming that the main switch 7 is open if switch 14 is closed the polar projections 10 and 11 of the stator will be excited in such a manner as to produce a magnetic flux parallel with the line $a$. This magnetic flux can be considered as a result of two components, one in line with the primary brushes, that is to say parallel with the line $b$, and the other in line with the secondary brushes, that is to say parallel with the line $c$. If the rotor 1 is rotating the conductors thereon with which it is wound cut the magnetic field in line with the component $c$ and an electromotive force is thereby produced at the primary brushes 3 and 4, and the direction of rotation and the direction of the current in the windings 12 and 13 is so chosen that the electromotive force thus produced is opposed to the electromotive force between the source of supply T and ground G when the switch 7 is closed. In other words, the potential of the primary brush 3 is raised above that of the primary brush 4 independent of the connection of the primary brush set to an external source of electrical power supply. The ampere turns on the polar projections 10 and 11, and the number of conductors in the rotor and other factors, are so determined that when the rotor attains the desired normal speed of rotation the potential of the primary brush 3 equals the potential of the supply line T. The main switch 7 can then be closed without any danger of surges or other undesirable occurrences, whereafter the switch 14 can be opened and the metadyne remains connected to the source of supply. With regard to the magnetic flux component parallel with the line $b$, it will be found on consideration that, assuming the same direction of rotation and direction of current, the potentials at the brushes 3 and 6 will be the same and consequently no current will be caused to circulate in the secondary circuit through the electric motor 8, and similarly the potentials between the brushes 4 and 5 will be the same so that no current will be caused to circulate in the circuit containing the electric motor 9.

Referring now to Fig. 2, the general arrangements are very similar to those indicated in Fig. 1, but in place of the coils 12 and 13 on the stator poles 10 and 11 the stator polar projections 15 and 16 are wound with coils 17 and 18 connected between the source of supply T and ground G through a switch 19. The effect of the stator coils is to produce a magnetic flux parallel with the line $d$ which can be considered as being made up of components in the lines c and b, and assuming that the rotor 1 is rotating in the same direction as before, the magnetic flux components parallel with the line b will be found to produce an electromotive force between the secondary brushes 5 and 6, which will result in current circulating through the external secondary circuit containing the motors 8 and 9. This current circulating in the rotor windings will produce a magnetic flux in the direction of the line c, which magnetic flux together with that in this direction forming one of the components of the magnetic flux in line d is cut by the rotating conductors and produces an electromotive force between the brushes 3 and 4 in such a direction that the potential of the brush 3 will be raised to that of the line T, whereupon the main switch 7 can be closed, connecting the machine to the line.

The proceeding illustrated by Fig. 2 is better than the proceeding illustrated by Fig. 1; in fact, the flux created in the metadyne is due to the rotor ampere turns, and the stator is relatively smaller than the stator of a dynamo; therefore if the same flux must be created by a stator winding a much larger amount of energy is required, particularly if the total flux has to be created by only one pair of polar segments. Thus the energy required by the proceeding illustrated by Fig. 1 is much higher than that required by the proceeding illustrated by Fig. 2, and when the line voltage happens to be high the proceeding illustrated by Fig. 1 does not entirely prevent a shock, where with the proceeding of Fig. 2 the connection to the line is very smooth, the secondary current circulating in the right direction even before the connection to the supply.

In Fig. 3 the arrangements of Fig. 2 are superposed on those of Fig. 1, that is to say windings are provided on all the polar projections, namely 10 and 11 and 15 and 16. The conditions hereinabove described with reference to Figs. 1 and 2 will be simultaneously produced with the result that an electromotive force will be produced between the brushes 3 and 4 which will enable the switch 7 to be closed and the metadyne safely connected to the line. The windings 12, 13, 17 and 18 may be connected in series through a switch 19 between the supply line T and ground G as shown.

In Fig. 4 the circuit through the primary brushes 3 and 4 can be connected direct between the supply line T and ground G through an impedance 20 and switch 21 which form a shunt to the contacts of the main switch 7. As is well known in such case the switch 21 can be closed so that the machine will be connected to the line through the impedance 20, whereupon the current will gradually increase without surges or peaks from zero to that normally transmitted through the switch 7 by gradually reducing the value of the impedance 20, after which the switch 7 can be closed without detriment, leaving the metadyne transformer connected to the source of supply. The arrangements shown in Fig. 4 are not intended to be independently claimed, but are shown in order to aid the easy comprehension of the further description.

Referring to Fig. 5 the arrangement of stator windings, namely the coils 12, 13, 17 and 18, is similar to that shown in Fig. 3, but the circuit of said coils is connected through the switch 22 so as to form a shunt to the contacts of the main switch 7. The stator coils therefore form an impedance which has similar effects to the impedance 20 in Fig. 4. Consequently when the switch 22 is closed the conditions obtaining in Fig. 3 are produced with the addition of the impedance effect described with reference to Fig. 4 thereby enabling the switch 7 to be closed without disturbance. No further description of the operation of the arrangements in this figure is deemed necessary in view of the earlier description of Fig. 3.

Figure 6:
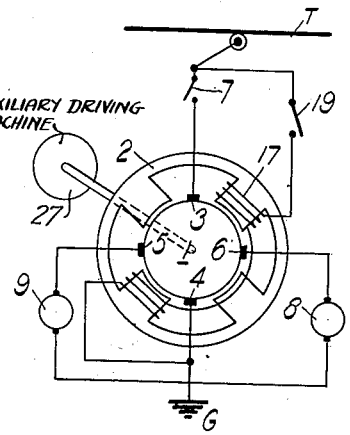
Figure 8:
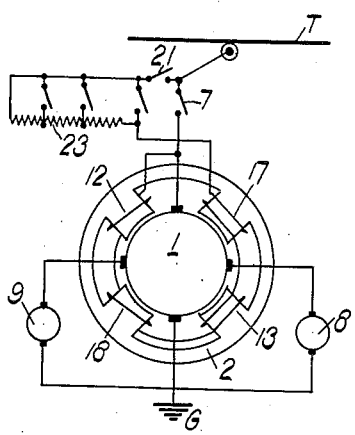

In Fig. 6 the arrangements of Fig. 2 are reproduced, but the motors 8 and 9 are connected in the well known cross-connection between the secondary brushes 5 and 6 instead of in the figure-8 connection as shown in Fig. 2.

Figure 7:
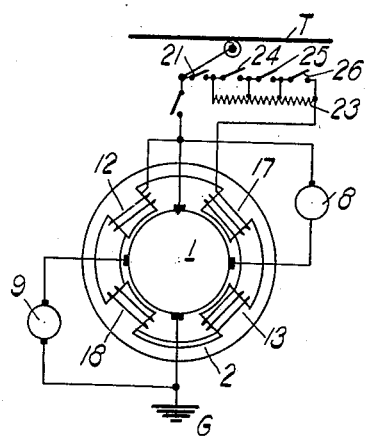

Fig. 7 shows arrangements similar to those of Fig. 5 with the addition of an adjustable impedance 23. This impedance is similar to the impedance 20 in Fig. 4 and is provided with switches 24, 25, 26, by which it can be gradually reduced to zero as the speed of the machine increases to the desired normal speed.

In Fig. 8 arrangements similar to those of Fig. 7 are provided, but the secondary circuit containing the motors 8 and 9 is connected between the brushes 5 and 6 in the well known cross-connection instead of in the figure-8 connection. In view of the explanations given of the earlier figures of the drawings it is deemed unnecessary to explain further the operation and working of the arrangements of Figs. 3, 7 and 8.

The machines shown in the diagrams are one-cycle machines that is to say the same disposition of electrical elements and magnetic elements recurs only once in progressing through one complete turn round the rotor in the air gap between the rotor and stator. In this case there are four polar projections and the primary and secondary brushes are located at the ends of diameters at right angles to each other. The invention is however applicable to multi-cycle machines and is not limited to the simple one-cycle machine which is illustrated.

I claim:—

1. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit across two of said brushes and including at least one of the brushes of said secondary brush set to provide an external secondary circuit, and means including a winding on said stator arranged to produce an electromotive force in said rotor secondary circuit and utilizing said external secondary circuit to complete an electric current carrying circuit for producing a counter-electromotive force in said rotor primary circuit balancing the voltage of said direct-current source of supply, said last mentioned means being independent of the connection of said primary brush set to said source of direct current supply.

2. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit to at least one of the brushes of said secondary brush set to provide an external secondary circuit, and means including a winding on said stator connected across said direct-current source of supply arranged to produce an electromotive force in said rotor secondary circuit and utilizing said external secondary circuit to complete an electric current carrying circuit for producing a counter-electromotive force in said rotor primary circuit balancing the voltage of said direct-current source of supply, said last mentioned means being independent of the connection of said primary brush set to said source of direct current supply.

3. An electrical system including a transformer metadyne having a stator and a rotor provided with windings and a commutator connected thereto, means including a primary brush set associated with said commutator for provding a primary circuit through said rotor, means including a secondary brush set associated with said commutator and arranged in electrical quadrature relation with said primary brush set for providing a secondary circuit through said rotor, a direct-current source of supply, means for connecting said source of direct-current supply across said primary brush set, a low-resistance load circuit, means for connecting said low-resistance load circuit to at least one of the brushes of said secondary brush set to provide an external secondary circuit, and means including a winding on said stator connected in series with said primary brush set across said direct-current source of supply arranged to produce an electromotive force in said rotor secondary circuit and utilizing said external secondary circuit to complete an electric current carrying circuit for producing a counter-electromotive force in said rotor primary circuit balancing the voltage of said direct-current source of supply, said last mentioned means being independent of the connection of said primary brush set to said source of direct current supply.

4. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, current-limiting devices, means for connecting said source of direct-current supply across said primary brush set in series with said current-limiting devices, a low-resistance load circuit, means for connecting said low-resistance load circuit to at least one of the brushes of said secondary brush set to provide an external secondary circuit, and means including a winding on said stator arranged to produce an electromotive force in said rotor secondary circuit and utilizing said external secondary circuit to complete an electric current carrying circuit for producing a counterelectromotive force in said rotor primary circuit balancing the voltage of said direct-current source of supply, said last mentioned means being independent of the connection of said primary brush set to said source of direct current supply.

5. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit across a primary and a secondary brush of said brush sets to provide an external secondary circuit, a winding on said stator arranged to produce a component of counterelectromotive force in said rotor primary circuit, and means including a second winding on said stator arranged to produce an electromotive force in said rotor secondary circuit and utilizing said external secondary circuit to complete an electric current carrying circuit to produce a second component of counterelectromotive force in said rotor primary circuit in the same direction as the component of counterelectromotive force produced by said first mentioned stator winding for balancing the voltage of said direct-current source of supply.

6. An electrical system including a transformer metadyne having a stator and rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit across said secondary brush set to provide an external secondary circuit, a winding on said stator arranged to produce a component of counterelectromotive force in said rotor primary circuit, and means including a second winding on said stator arranged to produce an electromotive force in said rotor secondary circuit and utilizing said external secondary circuit to complete an electric current carrying circuit to produce a second component of counterelectromotive force in said rotor primary circuit in the same direction as the component of counterelectromotive force produced by said first mentioned stator winding for balancing the voltage of said direct-current source of supply.

7. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit across a primary and a secondary brush of said brush sets to provide an external secondary circuit, and means including a winding on said stator connected across said source of direct-current supply arranged to produce an electromotive force in said rotor secondary circuit and utilizing said external secondary circuit to complete an electric current carrying circuit for producing a counterelectromotive force in said rotor primary circuit balancing the voltage of said direct-current source of supply.

8. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit across said secondary brush set to provide an external secondary circuit, and means including a winding on said stator connected across said source of direct-current supply arranged to produce an electromotive force in said rotor secondary circuit and utilizing said external secondary circuit to complete an electric current carrying circuit for producing a counterelectromotive force in said rotor primary circuit balancing the voltage of said direct-current source of supply, said last mentioned means being independent of the connection of said primary brush set to said source of direct-current supply.

9. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit across a primary and a secondary brush of said brush sets to provide an external secondary circuit, and means including a winding on said stator connected in series with said primary brush set across said direct-current source of supply arranged to produce an electromotive force in said rotor secondary circuit and utilizing said external secondary circuit to complete an electric current carrying circuit for producing a counter-electromotive force in said rotor primary circuit balancing the voltage of said direct-current source of supply.

10. An electrical system including a transformer metadyne having a stator and a rotor provided with windings and a commutator connected thereto, means including a primary brush set associated with said commutator for providing a primary circuit through said rotor, means including a secondary brush set associated with said commutator and arranged in electrical quadrature relation with said primary brush set for providing a secondary circuit through said rotor, a source of direct-current supply, means for connecting said source of direct-current supply across said primary brush set, a low-resistance load circuit, means for connecting said low-resistance load circuit across said secondary brush set to provide an external secondary circuit, and means including a winding on said stator connected in series with said primary brush set across said direct-current source of supply arranged to produce an electromotive force in said rotor secondary circuit and utilizing said external secondary circuit to complete an electric current carrying circuit for producing a counter-electromotive force in said rotor primary circuit balancing the voltage of said direct-current source of supply, said last mentioned means being independent of the connection of said primary brush set to said source of direct current supply.

11. An electrical system including a transformer metadyne having a stator and a rotor provided with windings and a commutator connected thereto, a primary brush set associated with said commutator, a secondary brush set associated with said commutator and arranged in electrical quadrature relation with said primary brush set, a source of direct-current supply, means for connecting said source of direct-current supply across said primary brush set, a low-resistance load circuit, means for connecting said low-resistance load circuit across a primary and a secondary brush of said brush sets, and means including a winding on said stator connected in series with said primary brush set across said direct-current source of supply and utilizing the ampere turns on said rotor for producing a counter-electromotive force on said rotor balancing the voltage of said direct-current source of supply, said last-mentioned means including a current-limiting device in series with said stator winding.

12. An electrical system including a transformer metadyne having a stator and a rotor provided with windings and a commutator connected thereto, a primary brush set associated with said commutator, a secondary brush set associated with said commutator and arranged in electrical quadrature relation with said primary brush set, a source of direct-current supply, means for connecting said source of direct-current supply across said primary brush set, a low-resistance load circuit, means for connecting said low-resistance load circuit across said secondary brush set, and means including a winding on said stator connected in series with said primary brush set across said direct-current source of supply and utilizing the ampere turns on said rotor for producing a counter-electromotive force on said rotor balancing the voltage of said direct-current source of supply, said last-mentioned means including a current-limiting device in series with said stator winding.

GIUSEPPE MASSIMO PESTARINI.